(Model.)

C. P. SHUFELT.
GRAIN BINDER.

No. 306,184. Patented Oct. 7, 1884.

Witnesses
W. C. Cowles
Affie M. Best

Inventor
Calvin P Shufelt
By Coburn & Thacher
Attorneys

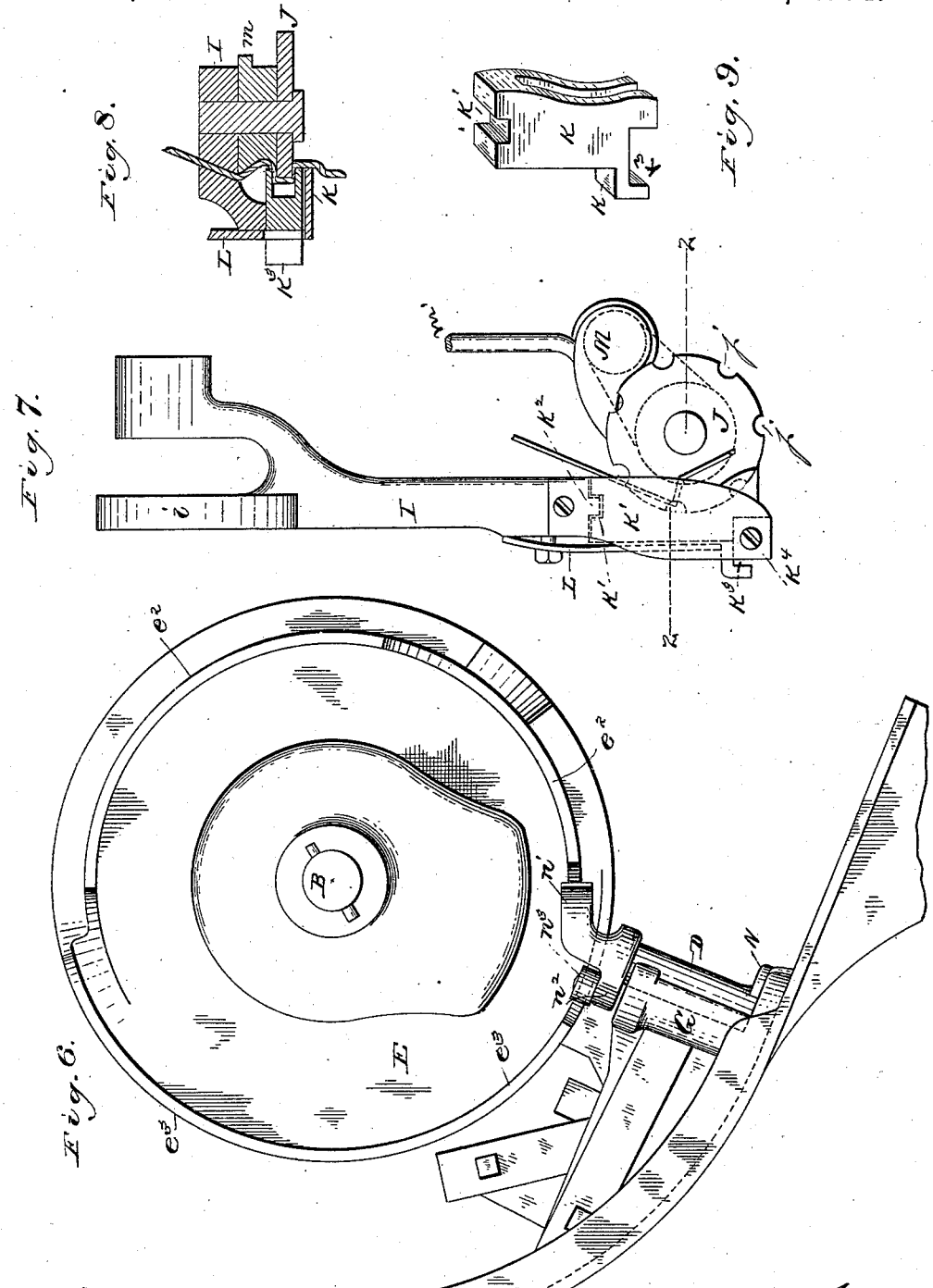

(Model.) 4 Sheets—Sheet 3.
C. P. SHUFELT.
GRAIN BINDER.
No. 306,184. Patented Oct. 7, 1884.
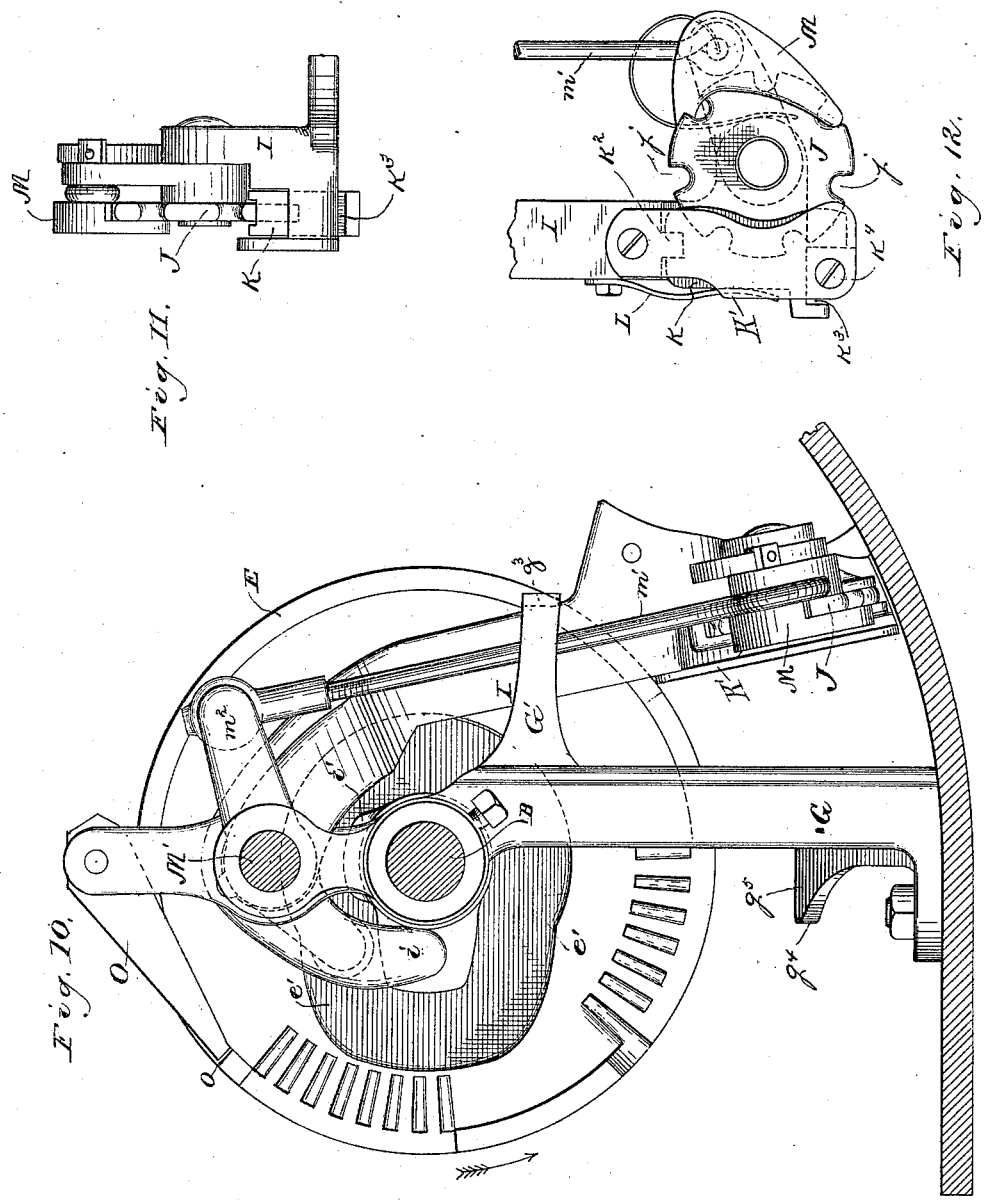
Witnesses.
Henry Frankfurter.
W. S. Baker.
Inventor.
Calvin P. Shufelt.
By Charles Colahan
his Attorney.

(Model.)  
4 Sheets—Sheet 4.
C. P. SHUFELT.
GRAIN BINDER.
No. 306,184. Patented Oct. 7, 1884.
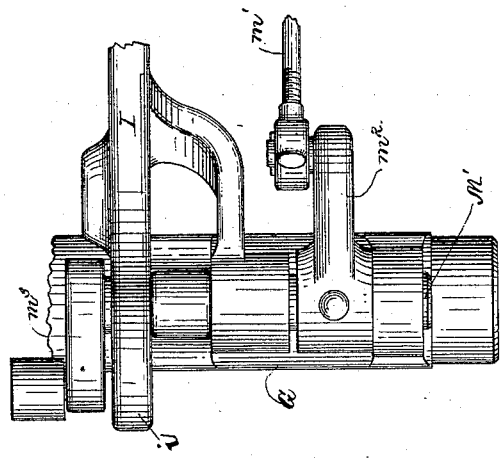
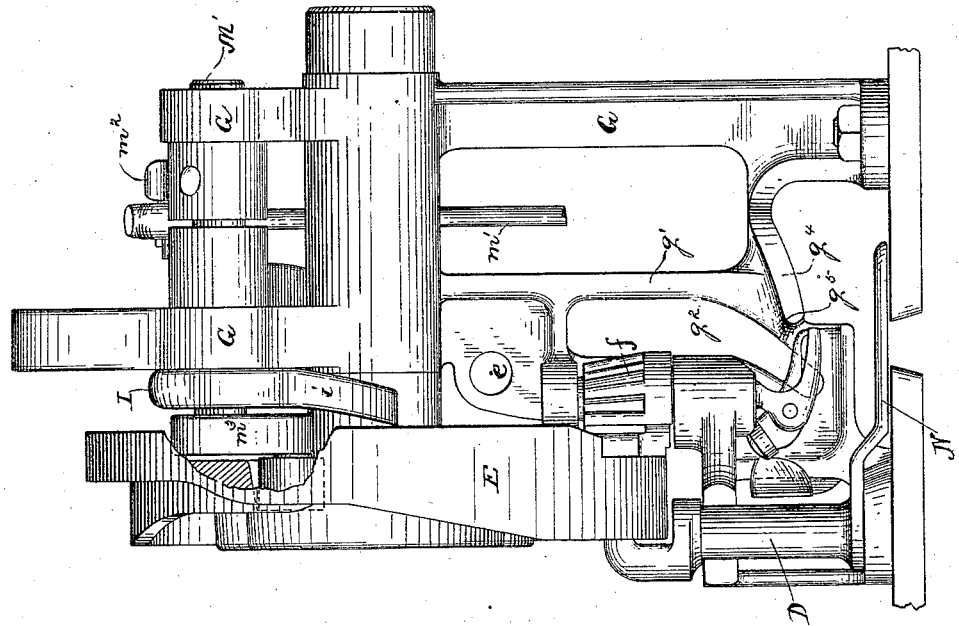
Witnesses  
Henry Frankfurter.  
W. L. Baker,
Inventor.  
Calvin P. Shufelt.  
By. Charles Colahan.  
his Attorney.

UNITED STATES PATENT OFFICE.

CALVIN P. SHUFELT, OF SANDWICH, ILLINOIS, ASSIGNOR OF ONE-HALF TO J. PHELPS ADAMS AND HENRY A. ADAMS, BOTH OF SAME PLACE.

GRAIN-BINDER.

SPECIFICATION forming part of Letters Patent No. 306,184, dated October 7, 1884.

Application filed March 7, 1883. (Model.)

*To all whom it may concern:*

Be it known that I, CALVIN P. SHUFELT, a citizen of the United States, residing at Sandwich, in the county of De Kalb, in the State of Illinois, have invented certain new and useful Improvements in Grain-Binders, which are fully set forth in the following specification, reference being had to the accompanying drawings, in which—

Figure 1:
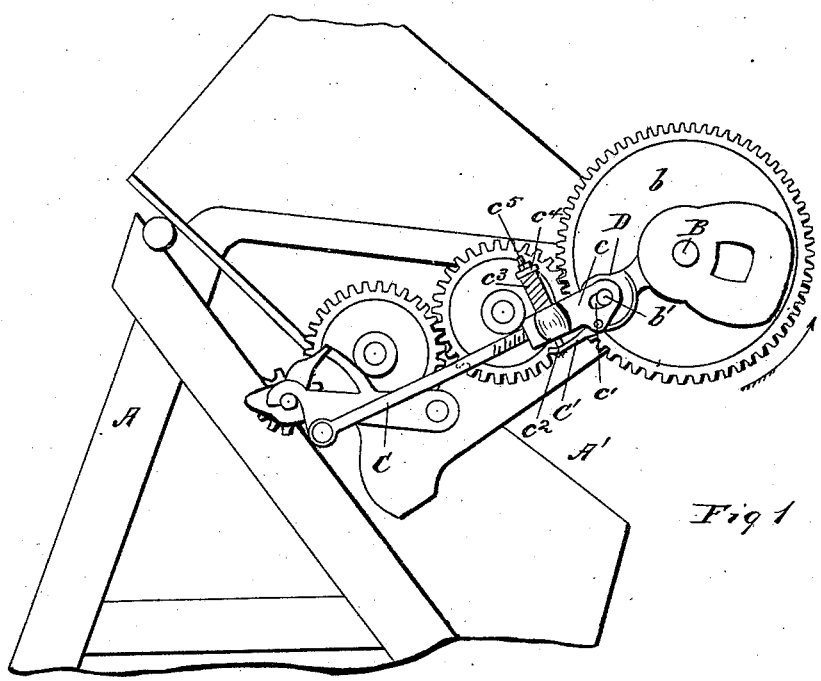
Figure 2:
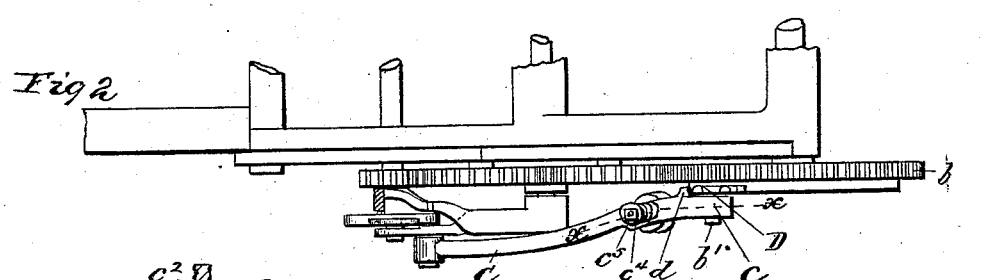
Figures 3, 4, 5:
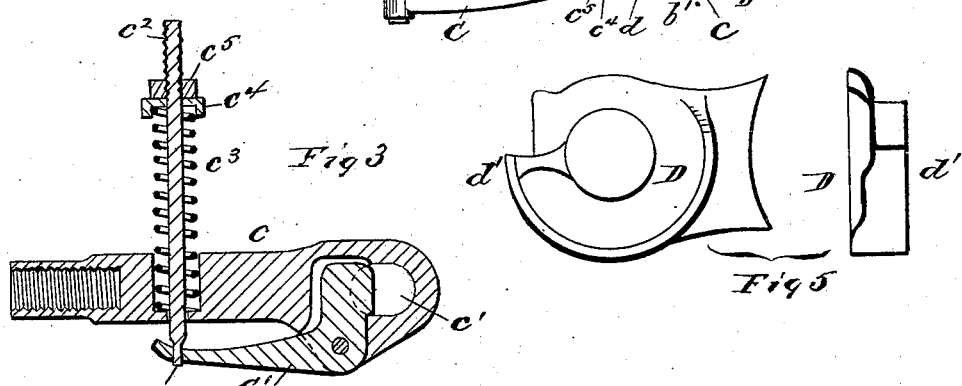

Figure 1 represents a rear end elevation of a grain-binder, showing the main gear-wheels and binder-arm-operating pitman; Fig. 2, a top plan view of the same parts; Fig. 3, a detail section on an enlarged scale, taken on the line $x$ $x$, Fig. 2; Fig. 4, a top plan of the outer end piece of the pitman; Fig. 5, side and edge elevations of the cam-stop on the crank-pin of the pitman; Fig. 6, an elevation of the knotting mechanism and co-operating devices taken from the front of the machine, and on a still more enlarged scale; Fig. 7, a front elevation of the cord-holding mechanism detached, on the same scale; Fig. 8, a section of the same taken on the line $z$ $z$, Fig. 7; and Fig. 9, a perspective of the grooved member of the cord-holder which receives the notched disk. Fig. 10 is an elevation of the parts shown in Fig. 6, taken from the rear of the machine and on the same scale, the shaft and part of the frame being in section. Fig. 11 is an edge view of the cord-holding mechanism. Fig. 12 is a side elevation of the same. Fig. 13 is an elevation of the parts shown in Fig. 10, taken from the inner side of the machine, and Fig. 14 is a sectional plan of the same.

My invention relates to that class of automatic grain-binders in which cord is used for the binding material, and in which an automatic tripping mechanism is provided for starting the binding mechanism when the gavel has reached a certain size.

My present invention consists in improvements in several parts of the machine, the construction and operation of which I will proceed to describe in detail, in connection with such other parts of the binder as are necessary to an understanding of the several improvements, as I have embodied them practically in one way, and I will then point out definitely in the claims the particular improvements which I believe to be new and desire to protect by Letters Patent.

The main parts of harvesting machines and binders are so well known that I shall not describe and show them here, and I shall confine myself to a description of those parts which are necessary to fully understand my present improvements, these being the portions of the machine which are also shown in the drawings, it being understood that these improvements may be applied to any machine adapted to their use.

In the drawings, A represents the elevator-frame of the machine, which in this instance is adapted to lift the grain over the main wheel, and A' the receiver into which the grain is delivered, and where it is accumulated by the action of packers of any ordinary construction.

My improvements are especially intended for use in connection with the machine described and shown in Letters Patent No. 265,159, heretofore granted to me, and a part of the present invention consists in improvements on some of the devices therein shown and described. The main shaft B of the binder has the main gear-wheel $b$ mounted on one end thereof, as shown in my prior patent, and in Fig. 1 of the drawings are shown the intermittent gears, main driving-shaft and pinion, clutch mechanism, and stop-arm, substantially the same as in my prior patent, and a pitman, C, connecting the stop-arm to the main wheel, substantially as in said patent. I have, however, made some improvement in the construction of this pitman, whereby a longitudinal independent movement of the pitman is provided, to permit of the independent movement of the stop-arm described in my former patent. The outer end of this pitman consists of a head, $c$, which is provided with an elongated opening, $c'$, for the reception of the crank-pin $b'$ on the wheel $b$. A bell-crank lever, C', is pivoted within a slot in this pitman-head, one arm of the lever extending upward into the slot and opposite the rear end of the opening $c'$ for the crank-pin, as shown in Fig. 3 of the drawings, and the bell-crank is sufficiently wide at its upper end to project forward into said opening, as shown in the same figure. The other arm of the lever extends backward on the under side of the pitman and is received at its extremity in an opening at the lower end of a rod, $c^2$, which passes up through and above the pitman-head and is threaded at its upper end. A spiral spring, $c^3$, is placed around the upper portion of this rod, the lower end of which is seated in the pitman-head and the upper end received and held in place by a cap, $c^4$, on the rod, above which is a nut, $c^5$, which holds the cap in place and adjusts the tension of the spring. It will be seen that the action of this spring will be to throw the end of the bell-crank lever forward against the crank-pin in the opening of the pitman-head, as shown in Figs. 1 and 3 of the drawings; but at the same time a slight longitudinal movement of the pitman in the direction of the main gear-wheel is permitted, the bell-crank lever vibrating against the pressure on the pin for this purpose, and the spring yielding to permit this vibration. In this way I provide for the independent movement of the stop-arm described in my patent mentioned above. When the stop-arm is thrown down quickly, there is a slight rebound, which sometimes is sufficient to permit the pivoted dog on the clutch to pass without coming in contact with the stop-arm, and so the binding mechanism continues in motion. To obviate this I provide a cam-stop, D, on the crank-pin. This cam-stop is circular in form, but is partially cut away, as shown in Fig. 5 of the drawings, and on the inner side of the pitman-head is a lug or shoulder, $d$, against which the circular portion $d'$ of the cam works. Now, obviously, as the crank-pin is carried round by the gear-wheel, to which it is attached, the pin makes an entire turn in the pitman, and so the cam-stop will make an entire turn against the lug on the inner side of the pitman. The cam is cut away so that it will be almost freed from the lug at the moment the stop-arm is thrown down; but as it is still in contact therewith it will effectually prevent the rebound of the latter, and so make the unshipping of the clutch certain at the completion of every revolution. The slight motion of the main gear-wheel after this is sufficient to complete the disengagement of the cam-stop from the lug, and so leave the pitman free to move laterally for the purpose above described. It will be understood, of course, that the inner section of the pitman is secured to the head in any suitable way, but has no lateral movement thereon. I prefer to thread the end of the inner section and provide a corresponding threaded socket in the end of the head, for this will permit adjustment as occasion may require.

On the main shaft B of the binder is a cam and gear wheel, E, located in about the usual position, and provided on its face next to the frame for the knotting devices with a short gear-section, which is intended to revolve the knotter F by the usual means of a pinion, $f$, on the shaft of said knotter with which this gear-section engages. The shaft of the knotter is mounted in suitable bearings on the frame G.

The cord-guide and knife-arm is not shown, but is intended to be of the usual construction in this class of machines. It is pivoted at $e$ to the branch of the frame G, in which the knotter is mounted, and its heel end extends into the cam-groove $e'$ in the face of the wheel E, whereby it is vibrated to strip the knot and cut the cord in the usual manner.

The frame G, instead of being left substantially open behind the knotting-hook, is constructed with an arm or branch, $g'$, providing a bearing for the shaft of the knotter-hook, and having an opening or slot, $g^2$, and this slot is constricted toward its lower end and bent inward, so as to terminate almost directly behind the knotting-hook. The cord passes through this slot to the cord-holder.

The construction of the frame G with a slotted branch behind the knotting-hook and the flange $g^4$ provides a support, $g^5$, against which the cord is drawn by the stripper-arm, so that this part of the frame serves as a support against which the cord is cut by the knife.

The frame that carries and supports the mechanism that seizes and holds the ends of the cord during the process of binding is of the swinging form that will admit of the yielding up of the cord toward the tyer at the proper moment to facilitate the formation of the loop for the knot, and the devices for actuating the disk, in combination with the swinging frame and cam-wheel, are arranged to operate in harmony, and I dispense with the devices heretofore used. It will also be observed that the pitman-rod $m'$ is made adjustable in its length by means of a screw-head, which, when detached from its crank, admits of the shortening or lengthening the pitman-rod $m'$ to increase or decrease the movements of the pawl, which causes the cord-holding disk to revolve, which enables me to secure any desired rotary movement of said disk in combination with the rock-shaft that actuates the same, and also serves as the supporting-axis of the swinging frame.

The cord-holder is of the notched-disk type, and is mounted on a swinging arm or support, I, one end of which is hinged or pivoted to the upper part of the frame G, the other end being free. The pivoted end of this arm is provided with a short arm, and on the hub of the cam-wheel is a cam, $i'$, embraced by this short arm $i$, whereby the arm I is vibrated toward and from the knotting-hook for the usual well-known purpose, this movement being obviously effected by the rotation of the cam-wheel.

On the back side of the frame G is a projecting arm, G', which has a stop, $g^3$, arranged to prevent the cord-holder arm from swinging back too far.

The cord-holding device consists of the disk J, provided with notches $j$ in its outer edge, and a block, K, provided with the groove or slot $k$ in one edge, within which the edge of the disk is received, whereby the cord is clamped by the disk within the groove. This piece K has heretofore been pivoted at one end and held up to its work by a spring arranged behind it. In such construction some difficulty has been experienced, from the fact that the disk in carrying in the cord at the upper end of the groove, as usual, will sometimes, when meeting irregular sizes and thick places in the cord, push the grooved piece outward so far on its pivot heretofore used as to release the end piece of the cord, which is held in the clamp near the lower end of the block. To obviate this difficulty, I secure the block K in the arm I in such a way as to admit of a slight free movement of said block K at the upper end as well as the lower. This I accomplish by making a transverse recess or groove, $k'$, in the upper end, which receives and is retained in place by a similarly-shaped lug or projection, $k^2$, on the arm I, a recess in the block, however, being somewhat wider than this lug K, so as to permit a slight play back and forth at the upper end of the block. The lower end of the block is provided with a similar recess or groove, $k^3$, which embraces a projection or seat, $k^4$, on the extreme end of the arm I, the recess or groove $k^3$ being wider than this seat $k^4$, so as to permit the required movement back and forth at the lower end of the block K. It will thus be seen that the block K is held between two projections or seats, and supported and limited by said seats to the required free movement to adapt itself to the cord in use, and the spring L preserves the desired pressure to retain the cord which may be in one of the notches $j$ of the disk J on the swinging arm I, as shown in Figs. 7 and 8 of the drawings. The notched disk is also mounted on the arm I. The face-plate K', fastened to the inside of the arm I, serves to hold the block K in place, the latter being set in loosely between the plate and the arm. Behind the block K is a spring, L, fastened to the arm I, and with its free end resting on the back of the block K, near its lower end, to hold the latter up to engagement with the disk.

Obviously, with this construction and arrangement of the holding devices, whenever any special strain is brought upon the upper end of the block, on account of irregularity in the size of the cord carried into the groove by the notched disk at that point, this upper end will yield sufficiently to accommodate the various thicknesses of the cord without throwing outward the lower end of the block which would be liable to release the cord clamped and held in the groove by the notched disk near that point, and so that the difficulty of the cord becoming released, as mentioned above, is entirely obviated, and the grooved block K having a limited free movement toward the revolving disk, the block will rock or incline in at the top and firmly clamp the cord against the disk and adjust itself to any varying size of cord.

The notched cord-holding disk is secured to the swinging arm I and caused to revolve intermittently by the pawl M, this pawl being pivoted to its arm $m$, which is secured to the swinging arm I, said arm I being supported on shaft M', which shaft M' also has suitable bearing wherein it is journaled and supported on frame G. Said supporting-shaft M' also is caused to rock in its bearings and to actuate the cord-holding disk at proper intervals when the binder-arm brings the cord up to the notched disk. The shaft M', upon which the arm I is supported, has a projecting arm or crank, $m^2$, onto which is secured the adjustable pitman $m'$, while the lower end of said pitman is secured to and actuates the pawl that rotates the disk J, as said shaft M' is rocked by means of its crank-arm $m^3$, provided with a friction-roller which extends into the cam-groove $e'$ in the wheel E.

During the operation of the binding of a bundle, when the cord is brought up to the notched disk, the wheel E is revolving, and its cam, projecting outward from the center thereof, will cause the crank $m^3$ and its friction-roller to rock the shaft M', which will cause the corresponding crank, $m^2$, to which the pitman $m'$ is secured, to depress or force downward said pitman, and its pawl will be brought into the next succeeding lower groove, $j$, of the disk J, and as said wheel E continues to revolve the crank-arm $m^3$ and its friction-roller will be brought in contact with the opposite side of said cam-groove and forced to rock the shaft M' in the opposite direction, which will raise the crank $m^2$, and its pitman will cause the pawl to partially revolve the disk, which will seize the cord from the binder-arm and carry the end into the grooved block K, when the wheel E, continuing to revolve, will bring its cam $i'$, which is cast on the hub thereof, in contact with the short arm $i$ of the swinging arm I, and cause said arm I and the cord-holding disk J, attached thereto, to swing in toward the knotting-hook and yield up cord to form the knot, while during the continuing revolution of the wheel E, and after the knot is tied, the side of the cam-groove $e'$, projecting outward from the center thereof, will be brought in contact with the friction-roller of the arm H and cause said arm to vibrate at the desired moment, and thus cut the cord and force the knot from the tying-bill, and the continued revolution of the wheel will bring the roller of arm H in contact with the opposite side of said cam-groove $e'$ and cause the return of said arm to its normal position. Thus it will be observed that the cam-groove $e'$ in wheel E performs the double function, at separate times, of operating the cord-holding disk and the guide and knife arm H alternately and at the desired intervals.

The tucker or cord-placer N is attached to a shaft, D, which is mounted on the frame G, just outside of the cam-wheel. This shaft stands upward and opposite the face of the cam-wheel, and is provided with an arm, $n'$, turned at an angle to the shaft. A cam-flange, $e^2$, is provided on the outer face of the wheel, a little inside the periphery thereof, and arranged to act upon the arm $n'$ of the tucker-shaft, being shaped and arranged so as to move the shaft to throw the tucker backward. The shaft also carries a short projecting arm, $n^2$, extending outward from the side of the shaft at right angles to the arm $n'$, and in this instance provided with a pin carrying a friction-roller, $n^3$. A cam-flange, $e^3$, is provided on the edge of the outer face of the cam-wheel, being shaped and arranged so as to work against this friction-roller, thereby moving the tucker-shaft in a direction to throw the tucker forward when the cam-wheel commences to rotate, just at the desired moment for placing the strands of cord in position for the certain operation of the knotting-hook. It will thus be seen that the tucker is operated positively in both directions, and no spring is employed the force of which must be overcome in vibrating the tucker. I have also shown in the drawings a second short gear-section on the wheel E, like the first-described section, and separated from the latter by only a short space. This second gear-section is for the purpose of giving a second revolution to the knotting-hook after the cord is cut, whereby the bill is opened and the cord released to permit the discharge of the bundle without actual pull on the cord. I also provide a spring-pawl, O, fastened to some convenient part of the knotting-frame, and with its free end resting upon the inner face of the cam-wheel, preferably at the outer edge thereof, in which is cut a notch, $o$, with which the pawl engages at the end of the revolution of the wheel when the mechanism stops, and so securely holds this wheel from any backward movement, which sometimes accidentally occurs and produces derangement of the binding mechanism; but these I do not claim, and they may or may not be used, as desired.

The cam-flange which operates the cord-placer or tucker on its back-stroke is formed so as to complete this stroke in two motions, the first part of the flange being narrower than the second. By this device the tucker is stopped for a little time before the stroke is finished, and while it is still under the cord which has been laid over it by the receding binder-arm, thus holding up the cord out of the way, while the knife and guide-arm is moved back to its original position of rest while the bundle is formed.

I have now described the construction and organization of such parts of the machine as are necessary to an understanding of the application of my present improvements in one practical way, and I have described the operation of these special improvements as they have been set forth above sufficiently to enable those skilled in the art to understand the same.

I wish it to be understood that I do not limit myself in all particulars to the specific construction and arrangement of devices which are set forth above, and are shown in the drawings; but I desire to include in my invention such changes as may be made without departing from the principle in construction and operation of the several improvements as herein stated.

Having thus described my invention, what I claim as new, and desire to protect by Letters Patent, is—

1. The cord-holding disk and its pawl mounted on the swinging frame, the grooved clamping-piece K, secured loosely in said frame, the adjustable pitman-rod $m'$, its rock-shaft M', pivotally supporting said frame, in combination with the wheel E and its cam-groove, substantially as shown and described.

2. The notched disk J, in combination with the block K, having the grooves $k'$ and $k^3$, and mounted loosely in the swinging frame I, having the seats $k^2$ and $k^4$ to permit a movement of the block at each end thereof, and the spring I, substantially as described.

3. The combination of the vibrating cord-holder, supporting-frame carrying the cord-holder disk and pivoted on the rock-shaft M', the cranks $m^2$ $m^3$ on the rock-shaft, and the wheel E, having the cam-groove $e'$, substantially as described.

4. The cam-wheel E, provided with a cam-groove on its inner face, in combination with the rock-shaft M', and mechanism connecting the same with the cord-holder, and the vibrating stripper and cutter arm adapted to be operated independently of the cord-holder by this same cam-groove, substantially as shown and described.

5. The cam-wheel E, provided with the cam-groove $e'$, in combination with the stripper-arm H, the inner end of which is bent and extended into said groove, and the oscillating shaft M', provided with a crank-arm, $m^3$, also entering the cam-groove $e'$, and a crank-arm, $m^2$, to which the mechanism for working the cord-holding disk is connected, substantially as and for the purposes set forth.

6. The combination of the wheel E, having the cam-groove, with swinging frame carrying the cord-holder disk, operated from the wheel E by the adjustable pitman $m'$, the rock-shaft M', and the cranks $m^2$ and $m^3$, substantially as shown.

7. The frame G, provided with an elongated opening or slot, $g^2$, bent as described, in combination with the projecting cord stop and flange $g^5$, substantially as and for the purposes set forth.

8. The frame G, provided with a slotted branch back of the knotting-hook, the cord guide and stop $g^5$, cast in one piece, in combination with said knotting-hook, and a cord-cutter for severing the cord, substantially as and for the purposes set forth.

9. The combination, with the cord placer or tucker, having its shaft provided with the arms $n'$ and $n^2$, of the wheel E, and its cam-flanges $e^2$ and $e^3$, whereby it is vibrated positively in both directions, substantially as described.

10. The cord-placer or tucker, in combination with a rock-shaft to which it is attached, projecting arms on said shaft arranged at an angle to each other, and cam-flanges on the cam-wheel operating, respectively, on said arms, whereby the tucker is moved alternately and positively in both directions, substantially as described.

11. The cord placer or tucker, in combination with wheel and its cams for operating said cord placer and tucker on the back-stroke in two movements, whereby the tucker is first retracted partially, then stands stationary a moment, and then is further retracted to complete its back-stroke, substantially as and for the purposes set forth.

12. The cord placer or tucker, in combination with the rock-shaft D, the arm $n'$ on said shaft, and the cam-flange $e^2$, the first section of which is narrower than the latter portion thereof, substantially as and for the purposes set forth.

13. The main gear-wheel of the binder, in combination with the stop-arm, the pitman connecting said arm to the crank-pin on the gear-wheel, provided with an elongated slot in which said pin is received, and a yielding stop arranged in said slot behind the crank-pin, substantially as and for the purposes set forth.

14. The stop-arm, in combination with the pitman C, provided with a slot, $c'$, in which the crank-pin of the main binder gear-wheel is received, the angular lever C′, one end of which enters the slot in the pitman, a spring, $c^3$, and the rod $c^2$, substantially as and for the purposes set forth.

15. The stop-arm, and the pitman C, provided with the lug or shoulder $d$, in combination with the circular cam-stop D around the crank-pin of the main binder-gear, substantially as and for the purposes set forth.

CALVIN P. SHUFELT.

Witnesses:
W. C. CORLIES,
THOMAS H. PEASE.